(12) United States Patent
Kumar et al.

(10) Patent No.: US 11,055,932 B2
(45) Date of Patent: Jul. 6, 2021

(54) USAGE-BASED MAINTENANCE SERVICE SYSTEM

(71) Applicant: HONEYWELL INTERNATIONAL INC., Morris Plains, NJ (US)

(72) Inventors: Manoj Kumar, Atlanta, GA (US); Chris Hickenbottom, Glendale, AZ (US); Jan Zirnstein, Atlanta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 238 days.

(21) Appl. No.: 16/406,966

(22) Filed: May 8, 2019

(65) Prior Publication Data

US 2020/0357195 A1 Nov. 12, 2020

(51) Int. Cl.
| | | |
|---|---|---|
| G07C 5/00 | (2006.01) | |
| G07C 5/02 | (2006.01) | |
| G07C 5/08 | (2006.01) | |

(52) U.S. Cl.
CPC ............... G07C 5/008 (2013.01); G07C 5/02 (2013.01); G07C 5/08 (2013.01)

(58) Field of Classification Search
CPC ............. G07C 5/008; G07C 5/02; G07C 5/08
USPC ....................................................... 701/29.3
See application file for complete search history.

(56) References Cited

U.S. PATENT DOCUMENTS

| | | | |
|---|---|---|---|
| 5,646,400 A | 7/1997 | Perez et al. | |
| 7,269,569 B2 * | 9/2007 | Spira | G06Q 30/0202 |
| | | | 705/7.36 |
| 8,577,703 B2 | 11/2013 | McClellan et al. | |
| 2007/0112487 A1 | 5/2007 | Avery et al. | |
| 2010/0262442 A1 | 10/2010 | Wingenter | |
| 2013/0317665 A1 | 11/2013 | Fernandes et al. | |
| 2015/0142518 A1 * | 5/2015 | Farinha Gomes Felix | G06Q 10/02 |
| | | | 705/7.31 |
| 2015/0206206 A1 * | 7/2015 | Puente | G06Q 30/0283 |
| | | | 705/307 |
| 2016/0098869 A1 * | 4/2016 | Rood | G07C 5/0808 |
| | | | 701/32.7 |

(Continued)

FOREIGN PATENT DOCUMENTS

| | | |
|---|---|---|
| CN | 104217121 A | 12/2014 |
| EP | 2384971 A1 | 11/2011 |
| WO | 2016141138 A1 | 9/2016 |

OTHER PUBLICATIONS

Traxler, Bill, "MSP Offers Rebates for Preferred Engine Operation," dated Nov. 7, 2018 downloaded from https://aerospace.honeywell.com/en/blogs/2018/november/msp-offers-rebates-for-preferred-engine-operation on May 8, 2019.

Primary Examiner — Gertrude Arthur Jeanglaude
(74) Attorney, Agent, or Firm — Lorenz & Kopf, LLP

(57) ABSTRACT

Systems and methods of providing usage-based maintenance services for a plurality of vehicles arranged in a fleet includes receiving usage data. A usage parameter distribution is generated, and a fleet usage model is generated according to the distribution. The fleet usage model expresses a score as a function of the usage parameter. Also, a score distribution is generated, and a reward model is generated according to the score distribution. The reward model expresses a maintenance reward as a function of the score. Additionally, the score for one of the vehicles is determined using the fleet usage model, and the maintenance reward is determined for the vehicle using the reward model.

20 Claims, 8 Drawing Sheets

(56) References Cited

U.S. PATENT DOCUMENTS

2017/0183107 A1    6/2017  Brookhart et al.
2017/0372534 A1*  12/2017  Steketee ................ G07C 5/008
2018/0164815 A1    6/2018  Poeppel et al.
2018/0233039 A1    8/2018  McClellan et al.

* cited by examiner

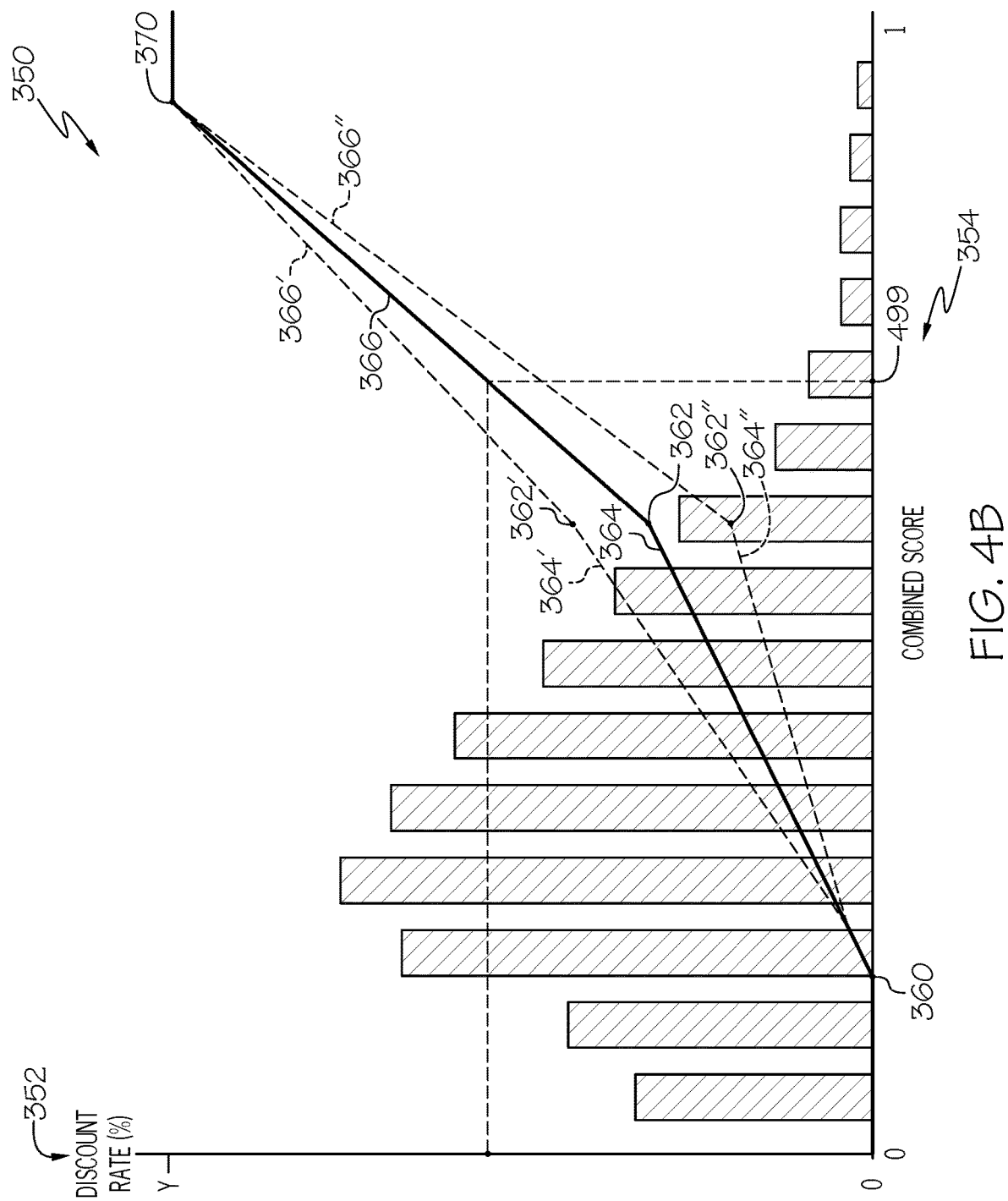

USAGE-BASED MAINTENANCE SERVICE SYSTEM

TECHNICAL FIELD

The present disclosure generally relates to vehicle maintenance services and, more particularly, relates to a usage-based maintenance service system.

BACKGROUND

Vehicles include complex components, such as engine systems, that require regular maintenance. For example, a user can cause wear on a vehicle engine over time, and maintenance services can address the engine wear and, in some cases, repair or replace the worn part. Accordingly, the maintenance services can keep the vehicle running efficiently and dependably.

However, maintenance costs can be expensive, and costs can be unpredictable. Also, the way the vehicle is used may correlate to the amount of wear on the engine. In some scenarios, however, maintenance costs can be the same for the different users. As such, a person that causes less wear can pay the same maintenance fees as another that causes more wear.

Thus, there is a need for a system and model that more fairly determines maintenance pricing. Other desirable features and characteristics of the systems and methods of the present disclosure will become apparent from the subsequent detailed description and the appended claims, taken in conjunction with the accompanying drawings and the preceding background.

BRIEF SUMMARY

In one embodiment, a method of operating a usage-based maintenance system for a plurality of vehicles arranged in a fleet is disclosed. The method includes receiving, by a processor, detected usage data from the fleet. The usage data includes a usage parameter for individual ones of the plurality of vehicles within the fleet over a predetermined time period. The method includes generating, by the processor from the usage data, a fleet usage distribution of the usage parameter for the plurality of vehicles across the fleet. Moreover, the method includes generating, by the processor, a fleet usage model according to the fleet usage distribution. The fleet usage model expresses a score as a function of the usage parameter. Furthermore, the method includes generating, by the processor, a score distribution of the score for the plurality of vehicles across the fleet. Also, the method includes generating, by the processor, a reward model according to the score distribution, the reward model expressing a maintenance reward as a function of the score. The method further includes receiving, by the processor, the usage parameter of one of the plurality of vehicles. Additionally, the method includes determining, by the processor using the fleet usage model, the score for the one of the plurality of vehicles according to the received usage parameter for the one of the plurality of vehicles. Moreover, the method includes determining, by the processor using the reward model, the maintenance reward for the one of the plurality of vehicles according to the score determined for the one of the plurality of vehicles.

In an additional embodiment, a usage-based maintenance system for a plurality of vehicles arranged in a fleet is disclosed. The system includes a data storage device and a processor configured to receive detected usage data from the fleet. The usage data includes a usage parameter for individual ones of the plurality of vehicles within the fleet over a predetermined time period. The processor is configured to generate a fleet usage distribution of the usage parameter for the plurality of vehicles across the fleet. The processor is also configured to generate a fleet usage model according to the fleet usage distribution. The fleet usage model expresses a score as a function of the usage parameter. Moreover, the processor is configured to generate a score distribution of the score for the plurality of vehicles across the fleet. Also, the processor is configured to generate and save on the data storage device a reward model according to the score distribution. The reward model expresses a maintenance reward as a function of the score. The processor is configured to receive the usage parameter of one of the plurality of vehicles. The processor is configured to determine, using the fleet usage model, the score for the one of the plurality of vehicles according to the received usage parameter for the one of the plurality of vehicles. Furthermore, the processor is configured to determine, using the reward model, the maintenance reward for the one of the plurality of vehicles according to the score determined for the one of the plurality of vehicles.

In another embodiment, a method of operating a usage-based maintenance system for a plurality of aircraft arranged in a fleet is disclosed. The method includes receiving, by a processor, detected usage data that includes at least two usage parameters for individual ones of the plurality of vehicles within the fleet over a predetermined time period. The at least two usage parameters are chosen from a group consisting of a flight length parameter, an environmental exposure parameter, and a throttle setting parameter. Also, the method includes generating, by the processor from the detected usage data, a first fleet usage distribution of one of the at least two usage parameters. Furthermore, the method includes generating, by the processor from the detected usage data, a second fleet usage distribution of another of the at least two usage parameters. Also, the method includes generating, by the processor, a first fleet usage model according to the first fleet usage distribution. The first fleet usage model expresses a first score as a function of the one of the at least two usage parameters. The method further includes generating, by the processor, a second fleet usage model according to the second fleet usage distribution. The second fleet usage model expresses a second score as a function of the other of the at least two usage parameters. Additionally, the method includes combining, by the processor, the first score and the second score into a combined score for individual ones of the plurality of aircraft. Moreover, the method includes generating a combined score distribution of the combined score for the plurality of aircraft across the fleet. Also, the method includes generating, by the processor, a reward model according to the combined score distribution. The reward model expresses a maintenance service discount percentage as a function of the combined score. The method also includes receiving, by the processor, the at least two usage parameters of one of the plurality of vehicles. Furthermore, the method includes determining, by the processor using the first and second fleet usage models, the first score and the second score for the one of the plurality of vehicles according to the at least two usage parameters received for the one of the plurality of vehicles. Also, the method includes determining, by the processor, the combined score for the one of the plurality of vehicles according to the determined first and second scores for the one of the plurality of vehicles. Moreover, the method includes determining, by the processor using the reward model, the maintenance service discount percentage for the one of the plurality of vehicles according to the combined score determined for the one of the plurality of vehicles.

BRIEF DESCRIPTION OF THE DRAWINGS

The present disclosure will hereinafter be described in conjunction with the following drawing figures, wherein like numerals denote like elements, and wherein:

FIG. 4B is a discount model that is configured for determining a maintenance discount according to detected usage of a vehicle within the system;

DETAILED DESCRIPTION

Figure 1:
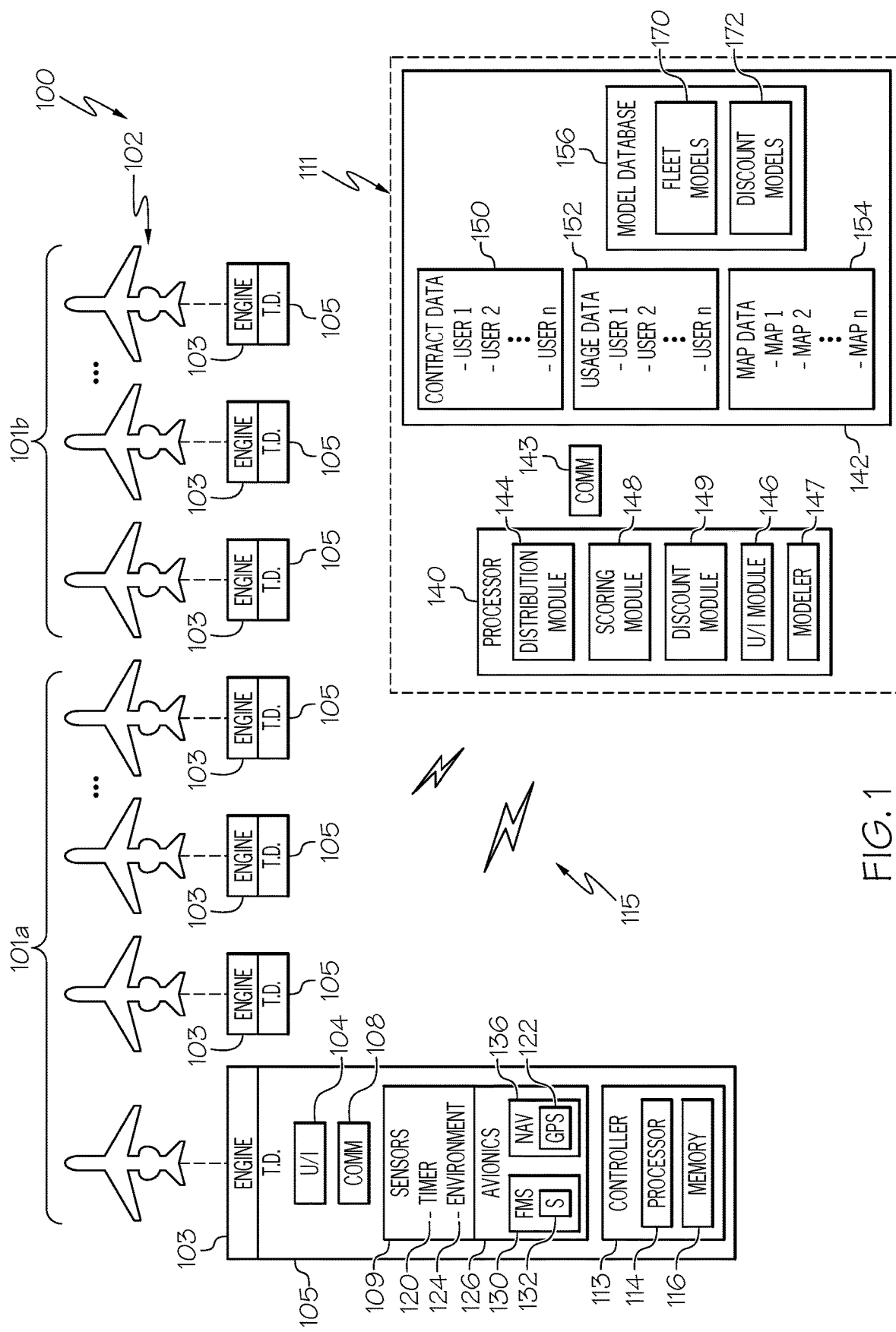
FIG. 1 is a schematic diagram of a system according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

The present disclosure provides a system and method for pricing maintenance and/or other services for vehicles and/or the engines of the vehicles. Using the system of the present disclosure and its method of operations, pricing for maintenance and/or other services may be adjusted according to certain factors. For example, pricing for servicing an engine may be dependent upon how the engine is used over a given time period. Specifically, in some embodiments, the system may track usage characteristics that correlate directly or indirectly to engine wear. For example, the system may track flight length, environmental exposure, throttle settings, and/or other usage characteristics for the engines within a fleet over a predetermined time period.

This data may be used to generate one or more fleet usage models. The fleet usage model may reflect usage across the fleet for the time period. The models may be utilized for evaluating (scoring) the usage behavior of different members (persons or organizations participating in the program). Usage that tends to cause less wear on an engine can receive a different score from usage that tends to cause more wear on the engine. A variety of scores may be combined to generate a combined score for the member.

Additionally, in some embodiments, the system of the present disclosure may be used to generate one or more reward models. The reward model may be generated from usage scores accumulated for the members across the fleet. The reward model may be utilized for determining a reward for the different members based upon their usage scores.

Accordingly, as will be discussed, members that tend to cause less wear on their engine may receive larger rewards than those that tend to cause more engine wear. Rewards can be applied to future maintenance costs in some embodiments.

Moreover, according to the present disclosure, the fleet usage models and/or the reward models may be configured and re-configured according to important factors. The model(s) may be configured in a way that ensures fairness in the way the rewards are distributed across the fleet. The model(s) may be adjusted over time, if needed, to maintain this fairness. The models may be tailored (tuned) to ensure that the system runs efficiently, effectively, and predictably for both the customer and system organizer.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps will be described generally in terms of their functionality. Whether such functionality is implemented as hardware or software depends upon the particular application and design constraints imposed on the combined system. Skilled artisans may implement the described functionality in varying ways for each particular application, but such implementation decisions should not be interpreted as causing a departure from the scope of the present disclosure. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

In addition, those skilled in the art will appreciate that embodiments of the present disclosure may be practiced in conjunction with any method and/or system associated with gathering engine usage data, generating evaluation models based on the gathered data, and determining user rewards based on the models. It will also be appreciated that the methods and systems described herein are merely exemplary and configured according to the present disclosure. Further, it should be noted that many alternative or additional functional relationships or physical connections may be present in an embodiment of the present disclosure. In addition, while the figures shown herein depict examples with certain arrangements of elements, additional intervening elements, devices, features, or components may be present in an actual embodiment.

FIG. 1 depicts an exemplary embodiment of an engine maintenance system 100 according to example embodiments of the present disclosure. It will be understood that FIG. 1 is a simplified representation of the system 100 for purposes of explanation and ease of description, and that FIG. 1 is not intended to limit the application or scope of the subject matter in any way. Practical embodiments of the system 100 may vary from the illustrated embodiment without departing from the scope of the present disclosure. Also, the system 100 may include numerous other devices and components for providing additional functions and features, as will be appreciated in the art.

Generally, the system 100 may include a plurality of vehicles 102 that are arranged into one or more fleets 101a, 101b. In some embodiments, the vehicles 102 may be aircraft; however, it will be appreciated that the vehicles 102 may be of another type without departing from the scope of the present disclosure. In addition to the one or more engines 103, the vehicles 102 may respectively include a computerized terminal device 105.

The system 100 may also include a server device 111. The terminal devices 105 may be in communication with the server device 111 via a suitable communication network 115.

The engines 103 may be gas turbine engines, such as turbofan engines that propel the respective vehicle 102 and/or turboshaft engines that generate electric power for the respective vehicle 102. As will be discussed, the maintenance system 100 may be configured for facilitating maintenance on the engines 103 and/or for managing pricing and discounting of such maintenance services.

The fleets 101a, 101b of vehicles 102 may be arranged in various ways. For example, one fleet 101a may contain vehicles 102 of a certain type while another fleet 101b may contain vehicles 102 of a different type. In some embodiments, the first fleet 101a may include vehicles 102 with a configuration of the engine 103 (or engines) that is common to each within the fleet 101a. In contrast, the second fleet 101b may include vehicles 102 with a different configuration of engine 103. Accordingly, the vehicles 102 within the fleet 101a may include the same engine type, the same number of engines, etc., and the vehicles 102 within the other fleet 101b may include a different engine type, number of engines, etc.

The terminal device 105 may be a computerized device that supports operations of the system 100. The terminal device 105 of one of the vehicles 102 is illustrated in detail in FIG. 1, and it will be appreciated that the terminal devices 105 may include similar features. As shown, the terminal device 105 may include, without limitation, a user interface 104, a communication system 108, a sensor system 109, and a control system 113, suitably configured to support operation of the system 100 as described in greater detail below. The terminal device 105 may be incorporated within a flight control system, an electronic flight bag, a portable electronic device, and/or another device that supports operation of the system 100. Although the terminal devices 105 are represented as being onboard the vehicles 102 in FIG. 1, it will be appreciated that one or more features of the terminal device 105 may be independent of the vehicle 102 and/or may be a mobile device that is operable onboard or offboard the vehicle 102. Furthermore, the terminal device 105 may be embodied as a desktop computer, a smart phone, a tablet, or the like that communicates within the system 100.

The user interface 104 may include an input device with which a user (e.g., a pilot or other crewmember) may input commands, etc. The input device of the user interface 104 may include a keyboard, microphone, touch sensitive surface, control joystick, pointer device, touch sensitive surface such as a touch sensitive display, or other type. The user interface 104 may also include an output device that provides the user with information about the system 100 as will be discussed. The output device of the user interface 104 may include a visual display, a speaker, etc. The user interface 104 may include a variety of input and/or output devices. Furthermore, in some embodiments, the user interface 104 may be used by the pilot or other crew member to control the vehicle 102 (e.g., to change the aircraft's speed, trajectory, etc.). The user interface 104 is coupled to and in communication with the control system 113 and the processor 114 over a suitable architecture that supports the transfer of data, commands, power, etc. therebetween. Additionally, the user interface 104 and the processor 114 are cooperatively configured to allow a user to interact with other elements of the system 100 as will be discussed in more detail below.

Moreover, the communication system 108 may include one or more devices for communicating data between the server device 111 and one or more of the terminal devices 105. In an exemplary embodiment, the communication system 108 is coupled to the control system 113 and the processor 114 with a suitable architecture that supports the transfer of data, commands, power, etc. The communication system 108 may be configured to support communications to the vehicle 102, from the vehicle 102, and/or within the vehicle 102, as will be appreciated in the art. In this regard, the communication system 108 may be realized using any radio or non-radio communication system or another suitable data link system. In an exemplary embodiment, the communication system 108 is suitably configured to support communications between one vehicle 102 and another aircraft or ground location (e.g., air traffic control equipment and/or personnel).

The sensor system 109 may include one or more sensors configured to detect certain characteristics (usage characteristics) related to the use of the vehicle 102 and/or engines 103. For example, the sensor system 109 may include a timer device 120 that is configured to detect and measure the passage of time. Furthermore, the sensor system 109 may include one or more environment sensors 124. The environment sensor(s) 124 may be configured for detecting environmental conditions that affect the vehicle 102 and its engines 103. For example, the environment sensor(s) 124 may comprise a salinity sensor configured to detect the respective airborne salinity in the environment of the vehicle 102. Furthermore, the environment sensor 124 may comprise a thermometer configured to detect ambient temperature in the environment of the vehicle 102. The environment sensor 124 may comprise a hygrometer configured to detect humidity in the environment of the vehicle 102. Also, the environment sensor 124 may comprise a sensor that detects airborne dust exposure.

The sensor system 109 may, in some embodiments, include and/or may be associated with systems that are configured to support flight and associated operations of the vehicle 102. For example, the sensor system 109 may be associated with an avionics system 126 of the vehicle 102.

As shown in FIG. 1, the avionics system 112 may include and/or may be associated with a flight management system (FMS) 130. The FMS 130 may be operable for obtaining and/or providing real-time flight-related information. Furthermore, in some embodiments, the FMS 130 maintains information pertaining to a current flight plan (or alternatively, a current route or travel plan). Accordingly, the FMS 130 may include one or more FMS sensors 132 that detect real-time information. Specifically, the FMS sensors 132 may include an altimeter that detects the current altitude of the vehicle 102. Also, the FMS sensors 132 may be configured to detect the current, real-time trajectory of the vehicle 102, the airspeed of the vehicle 102, etc. Additionally, the FMS sensors 132 may detect the position of the throttle for the vehicle 102.

Moreover, information from the FMS sensors 132 or other system may be used to detect, track, or otherwise identify the current operating state (e.g., flight phase or phase of flight) of the vehicle 102. Various phases of flight are well known (e.g., a standing phase, a pushback or towing phase, a taxiing phase, a takeoff phase, a climbing phase, a cruising phase, a descent phase, an approach phase, a landing phase, and the like) and will not be described in detail herein. Also, the operating state (e.g., flight phase) may be determined according to an engine control system (e.g., a FADEC). Additionally, the flight management system 130 and/or other system may detect the current flight phase indirectly. For example, the FMS sensors 132 may comprise a weight-on-wheels sensor configured to detect that the vehicle 102 is landed. In addition to delineated flight phases, the flight management system 130 may identify other operating states of the vehicle 102 using the sensors 132, such as, for example, operation with one or more engines disabled, operation when afterburners onboard the vehicle 102 are being utilized, transonic and/or supersonic operation of the vehicle 102, and the like.

Additionally, the avionics system 126 may include or may be associated with a navigation system 136 of the vehicle 102 for supporting navigation operations of the vehicle 102. The navigation system 136 may be configured to obtain one or more navigational characteristics associated with operation of the vehicle 102. Accordingly, the navigation system 136 may include a positioning sensor 122 that is configured to detect a position of the respective vehicle 102. In some embodiments, the positioning sensor 122 may comprise a global positioning sensor (GPS) for detecting the global position of the respective vehicle 102; however, it will be appreciated that the positioning sensor 122 may be of another type without departing from the scope of the present disclosure. As such, the navigation system 128 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors 122 suitably configured to support operation of the navigation system 136, as will be appreciated in the art.

It will be appreciated that the avionics system 126 may include other sub-systems as well without departing from the scope of the present disclosure. For example, the avionics system 126 may include a flight control system, an air traffic management system, a radar system, a traffic avoidance system, an enhanced ground proximity warning system, an autopilot system, an autothrust system, a flight control system, a weather system, an electronic flight bag and/or another suitable avionics system.

The control system 113 may be a computerized device that includes at least one processor 114 and at least one data storage element 116. The data storage element 116 may be realized as RAM memory, flash memory, EPROM memory, EEPROM memory, registers, a hard disk, a removable disk, a CD-ROM, or any other form of storage medium known in the art. In this regard, the data storage element 116 can be coupled to the control system 113 and the processor 114 such that the processor 114 can read information from (and, in some cases, write information to) the data storage element 116. In the alternative, the data storage element 116 may be integral to the processor 114. As an example, the processor 114 and the data storage element 116 may reside in an ASIC. In practice, a functional or logical module/component of the control system 113 might be realized using program code that is maintained in the data storage element 116.

The processor 114 may include hardware, software, and/or firmware components configured to facilitate communications and/or interactions between the user interface 104, the communication system 108, the sensor system 109, the avionics system(s) 126, and the data storage element 116. The processor 114 may also perform additional tasks and/or functions described in greater detail below.

Depending on the embodiment, the processor 114 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 114 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 114 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processor 114, or in any practical combination thereof.

In some embodiments, the features and/or functionality of the processor 114 may be implemented as part of the sensor system 109 for detecting usage characteristics of the respective vehicle 102 and for supporting operations of the system 100 as will be discussed. Furthermore, the processor 114 may be implemented as part of the flight management system 130 for managing flight operations. Likewise, the processor 114 may be coupled to the navigation system 136 for obtaining real-time navigational data and/or information regarding operation of the vehicle 102. The processor 114 may also be coupled to the sensor system 109, which in turn, may also be coupled to the FMS 130, the navigation system 136, the communication system 108, and one or more additional avionics systems 126 to support navigation, flight planning, and other aircraft control functions, as well as to provide real-time data and/or information regarding operation of the vehicle 102 to the processor 114. Accordingly, as will be discussed, the sensor system 109 of the terminal device 105 may detect (i.e., measure) and track usage characteristics about the respective vehicle 102 and/or its engine(s) 103 over a predetermined time period. In some embodiments, the sensor system 109 may detect a plurality of usage characteristics including, but not limited to, flight time for the vehicle 102, time spent at different flight stages, location of the vehicle 102 and/or environmental conditions at those locations, and/or throttle positions over the time period. This data may be stored at the data storage element 116 in some embodiments. These detected usage characteristics can be utilized, therefore, to characterize how the vehicle 102 and the respective engine(s) 103 was used during the given time period. Similarly, the terminal devices 105 of the other vehicles 102 may similarly track the usage characteristics across the fleets 101a, 101b.

The usage characteristics detected and tracked by the terminal device 105 may be sent (via the communications system 108) to the server device 111 for further processing and data analysis. In additional embodiments, the processor 114 may perform local processing and perform at least some data analysis on the tracked usage characteristics before being sent to the server device 111 for further processing.

The server device 111 may be a computerized device that generally includes one or more processors 140, one or more data storage devices 142, and a communication device 143. The server device 111 may enable centralized computing, at least, with respect to maintenance services, pricing of maintenance services, and/or discounting maintenance services for the engines 103 of the vehicles 102 within the different fleets 101a, 101b. Accordingly, the server device 111 may be configured as a central server and a substantial amount of the processing/computing of vehicle use data, maintenance data, discount data, and/or other data may be performed by the processor 140 in cooperation with the data storage device 134. In some embodiments, the server device 111 may be responsible for delivering application logic, processing and providing computing resources to the terminal devices 105.

The communication device 143 may include one or more devices for communicating with the communication systems 108 of the terminal devices 105. Usage characteristics (i.e., usage data) tracked and sent by the terminal devices 105 may be communicated to the server device 111 via the communication device 143.

The processor 140 may include hardware, software, and/or firmware components configured, for example, to process usage data from the plurality of terminal devices 105. The processor 140 may include various modules for performing these tasks based on input received from the terminal devices 105. In some embodiments, the processor 140 may include a distribution module 144 programmed for compiling and generating a fleet-wide distributions of the usage data for the engines 103 within the system 100. Also, the processor 140 may include a modeler 147. The modeler 147 may be a module configured to create one or more models from the distributions of usage data. The model(s) may be used to evaluate usage of particular engines 103 in comparison with the rest of the engines within the same fleet. The modeler 147 may also generate at least one model used to determine a maintenance discount according to these evaluations.

The processor 140 may additionally include a scoring module 148. The scoring module 148 may utilize the model(s) created by the modeler 147 to score (i.e., evaluate) use of an engine 103 in comparison with the rest of the usage of engines within the fleet. As will be discussed, the processor 140 may receive detected usage characteristics of one of the vehicles 102 within one of the fleets 101a. Then, the processor 140 may determine one or more usage parameters, each indicating a usage characteristic for that vehicle 102 (e.g., a flight time usage parameter, an environmental exposure usage parameter, and/or a throttle power usage parameter). Next, the scoring module 148 may score the determined usage parameter according to a respective fleet usage model. The scoring module 148 may rely on a fleet usage model generated by the modeler 147 in order to evaluate a customer's use of an engine 103 during a given time period in comparison with usage across the fleet 101a.

Also, the processor 140 may include a discount module 149 (i.e., a reward module) programmed to determine a discount or other reward for a user based on the usage score output by the scoring module 148 and based on the discount model generated by the modeler 147. Furthermore, the processor 140 may include a user interface module 146, which is programmed to present information about the discount, usage data, and other data to one or more terminal devices 105.

Depending on the embodiment, the processor 140 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 140 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 140 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processor 140, or in any practical combination thereof.

The data storage device 142 may be realized as RAM memory, flash memory, EPROM memory, EEPROM memory, registers, a hard disk, a removable disk, a CD-ROM, or any other form of storage medium known in the art. In this regard, the data storage device 142 can be coupled to the processor 140 such that the processor 140 can read information from (and, in some cases, write information to) the data storage device 142. In the alternative, the data storage device 142 may be integral to the processor 140. As an example, the processor 140 and the data storage device 142 may reside in an ASIC. In practice, a functional or logical module/component of the processor 140 might be realized using program code that is maintained in the data storage device 142. Moreover, the data storage device 142 may include and/or access databases suitably configured to support operations of the system 100, such as, for example, a contract database 150, a usage database 152, a map database 154, and a model database 156, the contents of which will be discussed in detail below.

The contract database 150 may contain stored contract data for a plurality of individual users (indicated as "user 1" to "user n" in FIG. 1). These contracts may be configured in various ways and can include agreed-to terms for maintenance and maintenance pricing using the system 100. In some embodiments, for example, a membership service is provided in which members ("user 1" to "user n") enroll in a maintenance service plan (MSP) that covers maintenance on their vehicle 102 and/or the engine(s) 103 thereon. Members agree to pay an engine hour maintenance fee for future use of an engine 103 for a specified time period. Members can pay for engine maintenance services according to a predetermined per-hour rate. This can be comprehensive coverage that covers repair, replacement, refurbishment, retrofits, modifications, upgrades, user support, and the like. Accordingly, the system provides predictability regarding maintenance fees for the engines. Thus, members may be better able to manage future maintenance expenses. The contract database 150 may include contract data for each of the members ("user 1" to "user n"). The individual contract terms may differ from each other. For example, each contract may include different maintenance rates, different pricing escalation terms, different gratis terms, and different coverage terms, etc. In additional embodiments, the contracts may include substantially the same terms for each member.

The usage database 152 may store usage data (usage characteristics, usage parameters) that are tracked and received from the terminal devices 105. Thus, data within the usage database 152 may characterize usage of the vehicles 102 and/or engines 103 over given time periods.

In some embodiments, the usage data may be organized according to particular users ("user 1" to "user n") as indicated in FIG. 1. The users may be individual persons, a business organization, or other entity. However, it will be appreciated that the usage data may be organized according to the particular vehicle 102, according to the particular engine 103, or otherwise.

Furthermore, the map database 154 may store maps (map data) of one or more types. The maps may show environmental conditions for different mapped regions. In some embodiments, the map database 154 may store one or more air salinity maps representing the airborne salt content within different territories. In additional embodiments, the map database 154 may store weather map data representing ambient temperatures, humidity, air/dust content, or other environmental conditions for different territories.

Moreover, the model database 156 may include one or more fleet usage models 170 used to evaluate a user's engine usage in comparison with usage within the fleet 101*a*, 101*b* over the same or similar time periods. Using the fleet usage model 170, the processor 140 may determine a usage score reflective of this comparison. Also, the model database 156 may include one or more discounting models 172 used to calculate a discount for the customer according to their assigned usage score.

Figure 2:
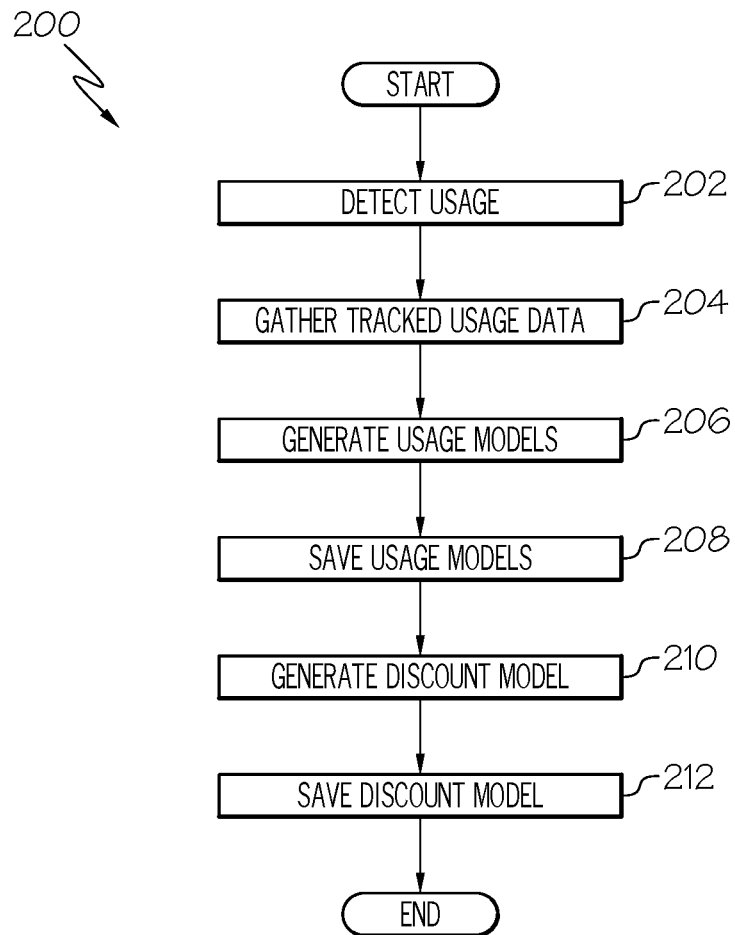
FIG. 2 is a flow chart illustrating a method of operating the system of FIG. 1 according to example embodiments.

Referring now to FIG. 2, a method 200 of operating the system 100 will be discussed according to example embodiments. In general, the method 200 may be employed for tracking use of the vehicles 102 and the engines 103 thereon. Also, the method 200 may be used for collecting this usage data and performing data analytics for generating one or more of the fleet usage models 170 from the tracked usage data. Additionally, the method 200 may be used to generate discount models 172 from the tracked usage data. The discount models 172 may be used for determining a user's maintenance discount for the time period.

As an example, it will be assumed that the method 200 is applied to the first fleet 101*a*. The method 200 may be similarly applied for vehicles 102 and engines 103 of the second fleet 101*b*. Also, it will be appreciated that the method 200 may be used for additional fleets of vehicles and engines.

For the sake of simplicity, it will be assumed that each vehicle 102 includes a single engine 103. However, it will be appreciated that the method 200 may accommodate vehicles 102 with multiple engines 103.

The following discussion will focus on "tracking and detecting usage of the engines 103" within the fleet 101*a*. It is understood that "tracking and detecting usage of one of the vehicles 102" equates to usage of the engine(s) 103 on that vehicle 102. Thus, these phrases are used interchangeably herein. Moreover, the term "usage" is used broadly herein. In some embodiments, the system 100 may track usage characteristics on occasions when the vehicle is in operation (when the engine 103 is powered ON) and on occasions when the vehicle is nonoperative (when the engine 103 is powered OFF).

The method 200 may begin at 202, wherein the terminal devices 105 of the vehicles 102 of the first fleet 101a track usage data for the respective engines 103. Specifically, the sensor system 109 of one vehicle 102 detects usage characteristics for the engines 103 thereon and provides sensor input to the respective processor 114. In some embodiments, at 202 of the method 200, the sensor system 109 may detect various usage conditions, such as flight time, environmental conditions, and/or throttle power settings for the respective engine 103. The processor 114 may save this sensor input in the data storage element 116. The terminal devices 105 of the other vehicles 102 may similarly collect usage data for the other engines 103 within the fleet 101a.

To detect flight time usage data, the control system 113 may utilize the FMS 130 or other system to distinguish between different flight phases, and the timer device 120 may record time spent between take-off and touch-down for different flights. In additional embodiments, a weight-on-wheels sensor and the timer device 120 may be used to determine flight time. This flight time usage data may be stored in the data storage element 116. In some embodiments, the processor 114 may process this time-of-flight data, for example, to find an average flight time for the engine 103 over a given time period and/or to determine use cycles for the respective engine 103.

To detect environmental exposure usage data, the sensor system 109 may detect environmental conditions directly with the environment sensors 124. For example, the environment sensor 124 may detect and track the amount of exposure of airborne salinity for the respective engine 103. In other embodiments, the sensor system 109 may utilize the GPS sensor to locate the vehicle 102, and the timer device 120 may time how long the vehicle 102 spends at the detected location. In some embodiments, the sensor system 109 may locate the vehicle 102 and detect how long the vehicle 102 is parked on ground at the detected location. This location data may be stored in the data storage element 116. As will be discussed, this location data may be correlated with a salinity exposure map saved in the map database 154 in order to determine the amount of salinity exposure.

Furthermore, the sensor system 109 may detect one or more conditions related to throttle power settings (i.e., PLA conditions). For example, the sensor system 109 may measure how the engines 103 are powered during specific phases of flight (e.g., at take-off, during climb, and at cruise). In some embodiments, the sensor system 109 may detect how much time is spent (over a given time period) with the throttle at a take-off power level and how much time is spent at a climb power level. Additionally, in some embodiments, the control system 113 may utilize the FMS 130 or other system to distinguish between different flight phases. The timer device 120 may record time spent at take-off throttle settings, and this take-off usage data may be stored in the data storage element 116. Likewise, the timer device 120 may record time spent at climb throttle settings, and this climb usage data may be stored in the data storage element 116. Furthermore, the sensor system 109 may detect and track the throttle position when the vehicle 102 is at cruise settings, and this cruise usage data may be stored in the data storage element 116.

Next, the method 200 may continue at 204, wherein the usage data recorded by the plurality of terminal devices 105 is transferred to the server device 111. At 204 of the method 200, members may upload usage data to the server device 111 periodically (e.g., once a month).

In other embodiments, the usage data recorded at 202 may be automatically uploaded to the server device 111. The communication system 108 of the terminal devices 105 may communicate the data to the communication device 143 of the server device 111, and the data may be saved at the usage database 152 of the server device 111.

In some embodiments, the processor 140 may further process the usage data received at 204. This may occur, for example, with regard to salinity exposure. As mentioned, at 202 of the method 200, the terminal device 105 may track the location of the vehicle 102 and how long the vehicle 102 spends parked at the detected location. In this example, at 204 of the method 200, the processor 140 of the server device 111 may correlate the detected location to a salinity exposure map stored at the map database 154. The map may include a plurality of identified salinity exposure zones having different assigned salinity exposure levels. An area near a coastline may have a high salinity exposure level, and an area further away from the coastline may have a lower salinity exposure level. Thus, the processor 140 may determine the amount of salinity exposure according to the detected amount of time spent at the assigned exposure level for the detected location. This information may be expressed as an "equivalent number of days" spent exposed to airborne salinity.

Figure 3:
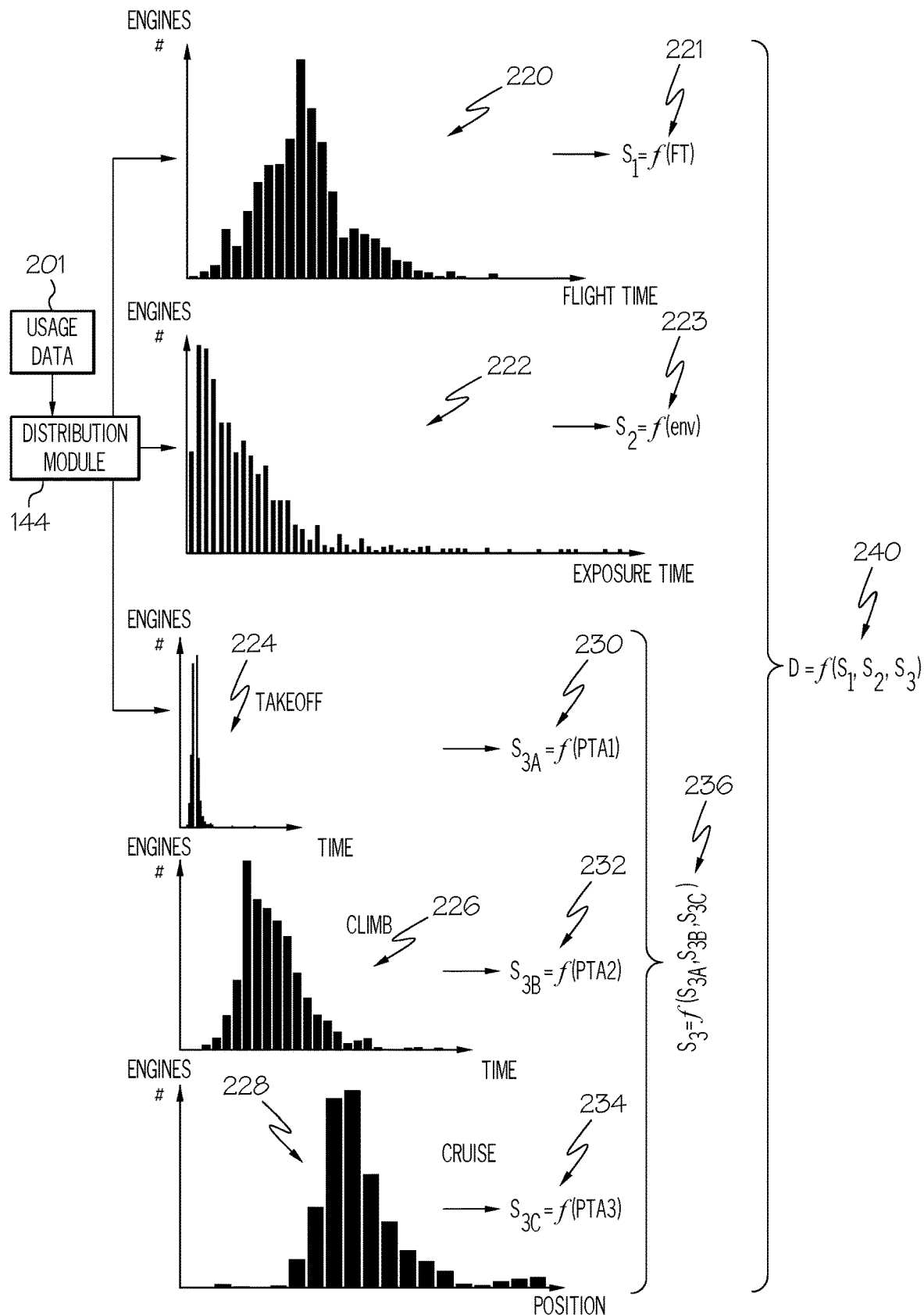
FIG. 3 is a schematic illustration of data processing performed according to the method of FIG. 2.

Subsequently, the method 200 may continue at 206, wherein the processor 140 generates fleet usage models. As shown in FIG. 3, the distribution module 144 may receive bulk usage data reported from the terminal devices 105 of the vehicles 102 within the fleet 101a. The distribution module 144 may be programmed to use statistical analysis to organize the usage data into a plurality of fleet usage distributions.

Specifically, from the usage data received at 204, the distribution module 144 may generate a first distribution 220 of flight length statistical data for the first fleet 101a. The first distribution 220 may include the 75th quartile of time (i.e., hours spent in flight) for each of the engines 103 within the first fleet 101a. (Average flight time is plotted on the X-axis, and the number of engines within the fleet 101a is plotted on the Y-axis.) From the first distribution 220, the distribution module 144 may generate a flight length usage model 221 for the fleet 101a. The flight length usage model 221 may be of a variety of types. For example, the model 221 may be expressed as a linear function (e.g., a piecewise linear function) of the type shown in FIG. 4A. However, it will be appreciated that the model 221 may be expressed as a nonlinear function in additional embodiments. As will be discussed, the flight length usage model 221 may be used to evaluate a user's flight length usage characteristics against the rest of the fleet 101a and to assign a corresponding flight length score (S1).

Generally, the flight length usage model 221 may be formulated to, in general, provide larger rewards for users that fly longer flights. Thus, in some embodiments, users that fly longer flights for the monitored time period will receive higher scores using the flight length usage model 221. Also, as will be discussed, the flight length usage model 221 may be tailored (i.e., adapted, adjusted, etc.) to make scoring fair across the fleet 101a and/or to achieve other business goals in the reward system 100.

Additionally, from the usage data received at 204, the distribution module 144 may generate a second distribution 222 of environmental exposure statistical data for the first fleet 101a. (Equivalent time spent in the saline environment is plotted on the X-axis and the number of engines within the fleet 101a is plotted on the Y-axis). From the second distribution 222, the distribution module 144 may generate an environmental exposure usage model 223 for the fleet 101a. As will be discussed, the model 223 may be used to evaluate a user's environmental exposure usage characteristics against the rest of the fleet 101a and to assign a corresponding exposure score (S2). The model 223 may be generated to meet various business goals and to establish a fair reward for certain members within the fleet 101a. The model 223 may be formulated to, in general, provide larger rewards for users whose engines 103 spend less time in salty environments.

Moreover, from the usage data received at 204, the distribution module 144 may generate a third distribution 224, a fourth distribution 226, and a fifth distribution 228. The third distribution 224 may include time spent at takeoff power levels on the X-axis and the corresponding total number of engines 103 of the first fleet 101a on the Y-axis. The fourth distribution 226 may include time spent at climb power levels on the X-axis and the corresponding total number of engines 103 of the first fleet 101a on the Y-axis. The fifth distribution 228 may include the average throttle position (measured in degrees) for the vehicles 102 in the first fleet 101a on the X-axis and the corresponding total number of engines 103 on the Y-axis. From the third distribution 224, the distribution module 144 may generate a take-off usage model 230 for the fleet 101a. From the fourth distribution 226, the distribution module 144 may generate a climb usage model 232 for the fleet 101a. From the fifth distribution 228, the distribution module 144 may generate a cruise usage model 234 for the fleet 101a. As will be discussed, the models 230, 232, 234 may be used to evaluate a user's throttle power usage characteristics against the rest of the fleet 101a and to assign corresponding throttle power scores (S3A, S3B, and S3C, respectively). The models 230, 232, 234 may be generated to meet various business goals and to establish a fair reward for certain users within the fleet 101a. The models 230, 232, 234 may be formulated to, in general, provide larger rewards for users that fly for less time at take-off power and/or less time at climb power and/or lower throttle setting at cruise.

In some embodiments, the processor 140 may generate a combined throttle power model 236 from the distributions 224, 226, 228 and/or from the models 230, 232, 234. As will be discussed, the combined throttle power model 236 may be used to evaluate a user's throttle combined power usage characteristics against the rest of the fleet 101a and to assign a corresponding throttle power score (S3). The model 236 may be generated to meet various business goals and to establish a fair reward for certain users within the fleet 101a. The model 236 may be formulated to, in general, provide larger rewards for users that fly for less time at take-off power and/or less time at climb power and/or lower throttle setting at cruise.

Next, as shown in FIG. 2, the method 200 may continue at 208. At 208, the flight length usage model 221, the environment exposure usage model 223, the throttle power usage models 230, 232, 234, and the combined throttle power usage model 236 may be saved in the model database 156.

Subsequently, the method 200 may continue at 210. At 210, the processor 140 may generate a discount model 240. As represented in FIGS. 3 and 4B, the scoring module 148 may combine the exposure scores S1, S2, S3 and calculate a combined score for the different engines within the fleet 101a. Thus, the combined score for an engine 103 is expressed as a function of all three of the scores S1, S2, S3. In some embodiments, the scoring module 148 may weight one of the scores S1, S2, S3 differently than another when calculating the combined score. In some embodiments, the scoring module 148 calculates a weighted sum of the scores S1, S2, S3 to produce the combined score. Next, at 210, the distribution module 144 may generate a distribution of the combined scores for the first fleet 101a. From this distribution, the modeler 147 may generate the discount model 240 for the fleet 101a. The discount model 240 may be of a variety of types. For example, the discount model 240 may be expressed as a linear function (e.g., a piecewise linear function) of the type shown in FIG. 4B. However, it will be appreciated that the model 240 may be expressed as a nonlinear function in additional embodiments.

As will be discussed, the discount model 240 may be used to determine a maintenance discount for users within the fleet 101a according to the usage history reflected in the user's combined score. The discount model 240 may be generated to meet various business goals and to establish a fair reward for users within the fleet 101a. According to the discount model 240, usage that tends to cause less wear on an engine 103 can result in larger discounts for the user and vice versa. Also, as will be discussed, the discount model 240 may be tailored (i.e., adapted, adjusted, etc.) to make the distribution of rewards fair across the fleet 101a and/or to achieve other business goals in the reward system 100.

Then, as shown in FIG. 2, the method 200 may continue at 212. At 212, the discount model 240 may be saved in the model database 156. Next, the method 200 may terminate.

Figure 4A:
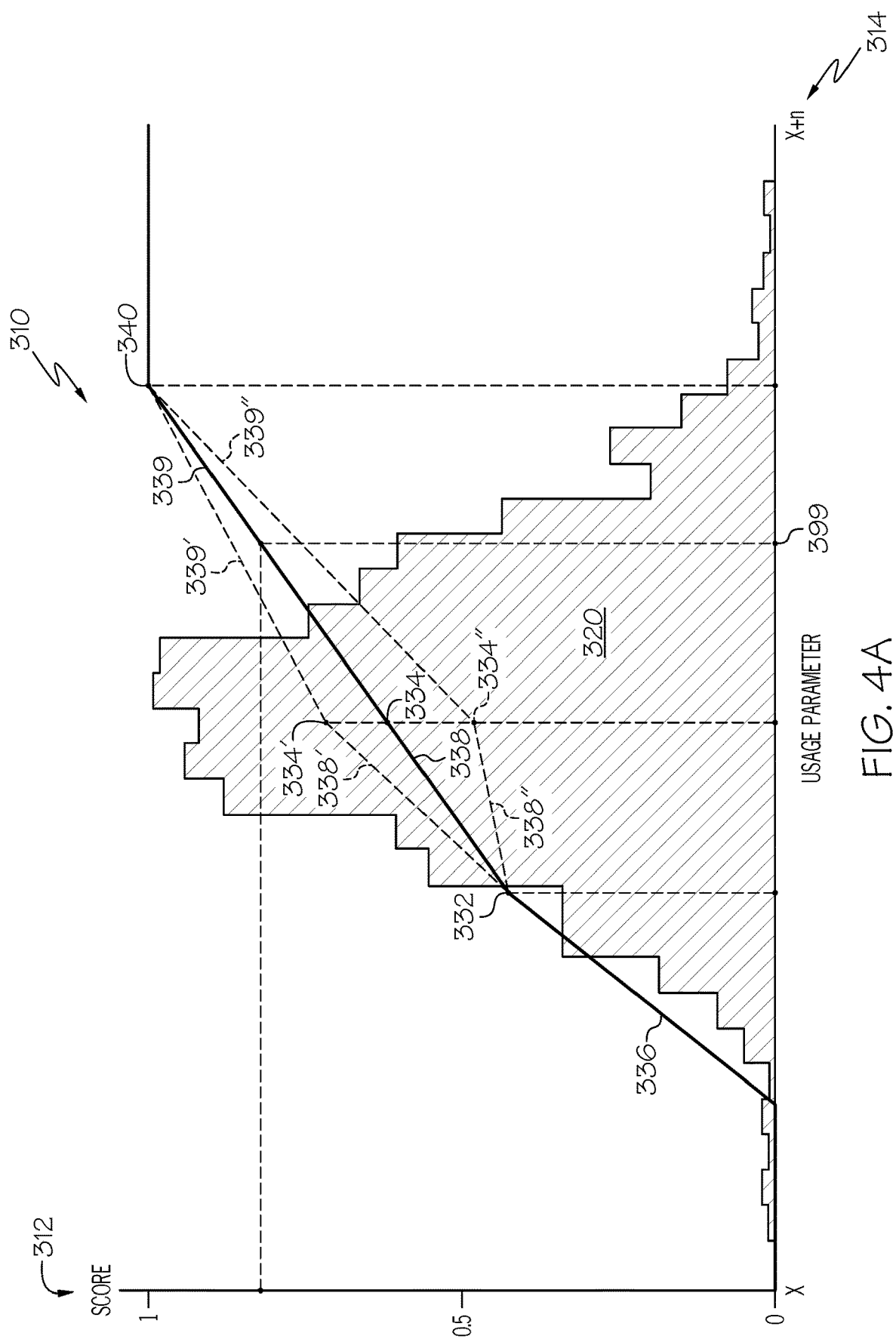
FIG. 4A is a usage model that is configured for evaluating usage of a vehicle within the system according to example embodiments of the present disclosure.

Referring now to FIG. 4A, an example usage model 310 is illustrated. The model 310 may be representative of one or more of the usage models 221, 223, 230, 232, 234, which were described above. A corresponding distribution 320 is shown overlaid for comparison with the model 310, and the distribution 320 may be representative of one or more of the distributions 220, 222, 224, 226, 228 discussed above. The modeler 147 (FIG. 1) may receive one of these distributions and generate at least part of the usage model 310 therefrom.

The usage model 310 may be used to evaluate the detected usage of one vehicle 102 against the usage detected for the rest of the fleet 101a for a given time period. As shown, the model 310 may express a score 312 (e.g., ranging between zero and one) as a function of a usage parameter 314 (ranging between X and X+n). In some embodiments, the model 310 is a linear function. Also, in some embodiments, the model 310 is a piecewise linear function that includes a plurality of straight-line sections. The model 310 may include a number of points (i.e., knit points, break points, changepoints, threshold point, knots, etc.) that define the piecewise linear function of the model 310. In some embodiments, the model 310 may include a first end point 330 (i.e., a first threshold point, a minimum point, etc.). This point 330 may represent a first threshold usage parameter, wherein a given usage parameter 314 at or below the first end point 330 results in the minimum score 312 (here, a score of zero (0)). The model 310 may also include a second end point 340 (i.e., a second threshold point, a maximum point, etc.). This point 340 may represent a second threshold usage parameter, wherein a given usage parameter 314 at or above the second end point 340 results in the maximum score 312 (here, a score of one (1)). As shown in FIG. 4A, the score 312 may range between zero (0) and one (1) for usage parameters 314 that are between the first and second end points 330, 340. Stated differently, the model 310 may further include one or more intermediate points that are disposed between the first and second end points 330, 340. For example, the model 310 may include a first intermediate point 332 and a second intermediate point 334. A first segment 336 extends between the first end point 330 and the first intermediate point 332. A second segment 338 extends between the first intermediate point 332 and the second intermediate point 334. A third segment 339 extends between the second intermediate point 334 and the second endpoint 340. The first segment 336 may have a positive slope that is different from (greater than) the second and third segments 338, 339. The second and third segments 338, 339 may have a positive slope that is substantially the same for both. It will be appreciated that the function included in the model 310 may vary from the illustrated embodiments, may include more or less points, may include more or less segments, may include different slopes, may be at least partially nonlinear (curved), etc.

Creation of the usage model 310 (at 206 of the method 200) will now be discussed according to example embodiments. For purposes of discussion, it will be assumed that the model 310 is representative of the flight length usage model 221. Accordingly, the score 312 on the Y-axis may be the flight length score, 51, and the usage parameter 314 on the X-axis may be flight length or flight time (FT) for the vehicles 102. The distribution 320 may be representative of the first distribution 220.

The usage model 310 may be created using a process of linear regression. Accordingly, the first endpoint 330 and the second endpoint 340 of the model 310 may be set and selected according to one or more considerations. In some embodiments, the first endpoint 330 may be selected such that a predetermined percentage of the fleet 101a receives a score 312 of zero (0); therefore, in the present example, vehicles averaging flight lengths less than the first end point 330 receive the score of zero (0). Conversely, the second endpoint 340 may be set and selected such that a predetermined percentage of the fleet 101a receives a score of one (1); therefore, in the present example, vehicles averaging flight lengths more than the second end point 340 receive the score of one (1). In some embodiments, the remaining portions of the model 310 may be defined by connecting the first and second endpoints 330, 340 with a straight line having a constant slope. In other embodiments (such as the illustrated embodiment), the first and/or second intermediate points 332, 334 may be set and selected such that the slope of the function changes between the end points 330, 340. For example, the first intermediate point 332 may be selected to make the segment 336 have a higher slope than the second and third segments 338, 339. The points 330, 332, 334, 340 may be selected and adjusted to, for example, ensure that the system 100 rewards its users fairly and in an efficient manner. For example, the first and/or second end points 330, 340 may be adjusted to change the percentage of members in the fleet 101a that receive a maintenance discount. Also, the intermediate points 332, 334 may be adjusted to ensure the scores 312 are substantially evenly distributed for those vehicles having flight length usage parameters 314 between the first and second end points 330, 340.

Furthermore, one or more intermediate points may be subsequently adjusted. As represented in FIG. 4A, the score 312 for the second intermediate point 334 may be increased to point 334' to thereby adjust the slope of the second and third segments 338', 339'. Conversely, the score 312 for the second intermediate point 334 may be decreased to point 334" to thereby decrease the slope of the first and second segments 338", 339". Thus, the function may be tailored, for example, to ensure even distribution of the scores for a predetermined percentage of the vehicles 102 within the fleet 101a.

The environmental exposure usage model 233 may be generated similarly. The endpoints 330, 340 may be set such that a predetermined percentage of the fleet 101a receives a score 312 of zero (0) and such that a predetermined percentage of the fleet 101a receives a score 312 of one (1). Also, the environmental exposure usage model 233 may include a piecewise linear function therebetween that is defined by one or more adjustable intermediate points 332, 334. In some embodiments, the slope of the function in the environmental exposure usage model 233 may be opposite that shown in FIG. 4A. In other words, the environmental exposure usage model 233 may establish an inverse relationship between the score 312 and the environmental exposure usage parameter 314. Accordingly, higher scores may be awarded to those vehicles 102 that had less exposure to harsh environments.

Likewise, the throttle position models 230, 232, 234 may be similarly generated. A different piecewise linear function may be generated for each. Endpoints 330, 340 for each function may be set such that a predetermined percentage of the fleet 101a receives a score 312 of zero (0) and such that a predetermined percentage of the fleet 101a receives a score 312 of one (1). Also, the slope of the segments in the function may be set and/or adjusted according to the intermediate point(s) therebetween. Like the environmental exposure usage model 233, the functions for the throttle position models 230, 232, 234 may have negative slopes. Accordingly, higher scores may be awarded to those vehicles 102 that put less strain on the engine due to the throttle position.

Accordingly, the models 221, 223, 230, 232, 234 may be tailored according to the usage data. The models 221, 223, 230, 232, 234 may be tailored to ensure that scores 312 are distributed evenly for a predetermined percentage of the fleet 101a. Also, it will be appreciated that the model(s) may be adjusted over time, if needed, to maintain this fairness. The models may be tailored (tuned) to ensure that the system runs efficiently, effectively, and predictably for both the customer and system organizer.

Referring now to FIG. 4B, an example discount model 350 is illustrated. The model 350 may be representative of the discount model 240, which was described above. The discount model 350 may be used to determine a discount for particular members based on their combined usage score (a combination of the scores S1, S2, and S3 as described above). As shown, the model 350 may express a discount rate 352 (ranging between 0% and Y %) as a function of the combined score 354 (ranging between zero (0) and one (1)). In some embodiments, the model 350 is a linear function. Also, in some embodiments, the model 350 is a piecewise linear function that includes a plurality of straight-line sections. The model 350 may include a number of points (i.e., knit points, break points, changepoints, threshold values, knots, etc.) that define the piecewise linear function of the model 350. It will be appreciated, however, that the function may vary from the illustrated embodiment. For example, in some embodiments, the function may be at least partially nonlinear (curved), etc.

In some embodiments, the model 350 may include a first end point 360 (i.e., a first threshold point, a minimum point, etc.). This point 360 may represent a first threshold score, wherein a given score 354 at or below the first end point 360 results in the minimum discount 352 (here, a discount of zero percent (0%)). The model 360 may also include a second end point 370 (i.e., a second threshold point, a maximum point, etc.). This point 370 may represent a second threshold score, wherein a given score at or above the second end point 370 results in the maximum discount 352 (here, a discount of Y percent (Y %)). As shown in FIG.

4B, the discount rate may range between zero percent (0%) and Y percent (Y %) for scores 354 that are between the first and second end points 360, 370. Stated differently, the model 350 may further include one or more intermediate points that are disposed between the first and second end points 360, 370. For example, the model 350 may include an intermediate point 362 disposed between the first and second end points 360, 370. A first segment 364 extends between the first end point 360 and the intermediate point 362. A second segment 366 extends between the intermediate point 362 and the second end point 370. The first segment 364 may have a positive slope that is different from (less than) the second segment 366. It will be appreciated that the function included in the model 350 may vary from the illustrated embodiments, may include more or less points, may include more or less segments, may include different slopes, may be at least partially nonlinear (curved), etc.

Creation of the discount model 350 (at 210 of the method 200) will now be discussed according to example embodiments. The discount model 350 may be created using a process of linear regression. Accordingly, the first endpoint 360 and the second endpoint 370 of the model 350 may be set and selected according to one or more considerations. In some embodiments, the first endpoint 360 may be selected such that a predetermined percentage of the fleet 101a receives no discount (a discount rate of 0%). Conversely, the second endpoint 370 may be set and selected such that a predetermined percentage of the fleet 101a receives a discount of Y %. In some embodiments, the remaining portions of the model 350 may be defined by connecting the first and second endpoints 360, 370 with a straight line having a constant slope. In other embodiments (such as the illustrated embodiment), the intermediate point 362 may be set and selected such that the slope of the function changes between the end points 360, 370. For example, the intermediate point 362 may be selected to change the slopes of the segments 364, 366. The points 360, 362, 370 may be selected and adjusted to, for example, ensure that the system 100 rewards its users fairly and in an efficient manner. For example, the intermediate point 362 may be adjusted to ensure the discounts are substantially evenly distributed for those vehicles having combined scores that are between the first and second end points 360, 370. Furthermore, one or more intermediate points may be subsequently adjusted. As represented in FIG. 4B, the discount rate 352 for the intermediate point 362 may be increased to point 362' to thereby adjust the slope of the segments 364', 366'. Conversely, the discount rate for the intermediate point 362 may be decreased to point 362" to thereby decrease the slope of the segments 364", 366". Thus, the function may be tailored, for example, to ensure even distribution of the discounts for a predetermined percentage of the vehicles 102 within the fleet 101a.

Figure 5:
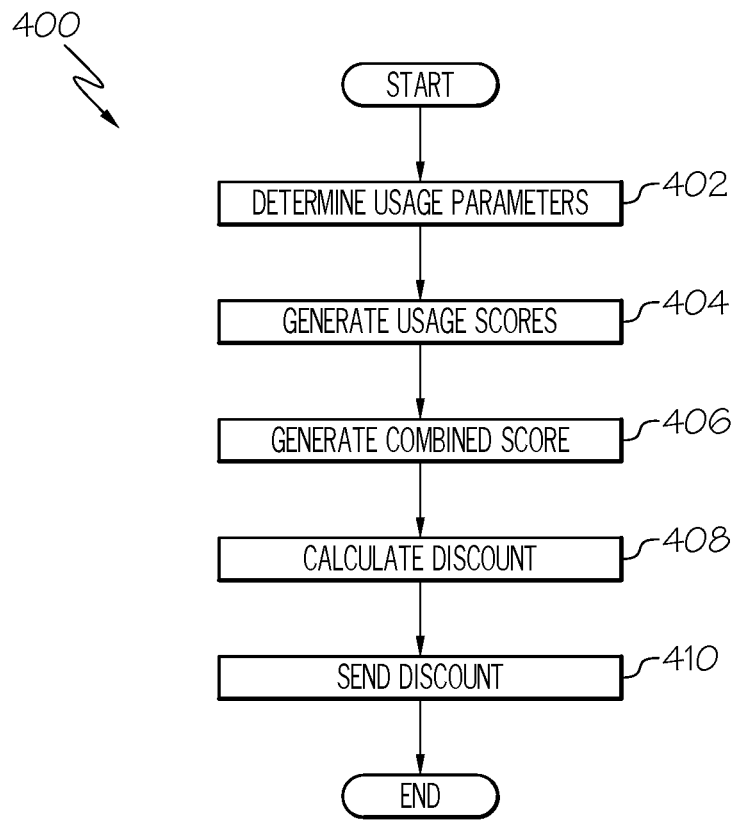
FIG. 5 is a flow chart illustrating a method of operating the system of FIG. 1 according to example embodiments.

Referring now to FIG. 5, a method 400 of operating the system 100 will be discussed according to example embodiments. In general, the method 400 may be employed for determining, for a time period, usage parameters of a particular vehicle 102. These usage parameters indicate usage characteristics of that vehicle 102 over the time period. The method 400 may also be used to score the determined usage parameters according to the fleet usage models 221, 223, 236 to produce a combined usage score. Additionally, the method 400 may be used to determine a maintenance discount according to the combined usage score using the discount model 240.

The method 400 may begin at 402, wherein usage parameters for the respective engine 103 are determined for a given time period (e.g., one month). Continuing with the example discussed in relation to FIGS. 2 and 3, at 402 of the method 400, a flight time usage parameter can be determined to indicate how long the vehicle 102 spent in-flight during the time period. Also, an environmental exposure usage parameter can be determined to indicate how much the vehicle 102 was exposed to high-salinity environments during the time period. Moreover, a throttle power usage parameter may be determined to indicate how the engine 103 was powered during the time period. Accordingly, 402 of the method 400 may substantially correspond (and, in some embodiments coincide) with 202 of the method 200. The usage parameters may be saved at the usage database 152 of the server device 111.

Specifically, at 402 of the method 400, the sensor system 109 may detect different flight phases of the vehicle 102 using the FMS sensor 132 or other system, and the timer device 120 may record time spent between take-off and touch-down for different flights. In some embodiments, the processor 114 or processor 140 may process this time-of-flight data, for example, to find an average flight time for the engine 103 over the time period and/or to determine use cycles for the respective engine 103. Accordingly, an average flight time parameter 452 (FIG. 5) over the time period may be determined for the vehicle 102.

Also, at 402 of the method 400, the sensor system 109 may locate the vehicle 102 during the time period using the positioning sensor 122. The timer device 120 may also detect the amount of time the vehicle 102 spends at the detected location(s). In some embodiments, the timer device 120 may record how long the vehicle 102 spends parked at the detected location(s). Also, the processor 140 may correlate the detected location(s) with one or more maps stored at the map database 154. The map may include a plurality of identified salinity exposure zones, and the zones may have different assigned exposure levels. The processor 140 may determine an environment exposure parameter 454 (FIG. 5) according to the detected amount of time spent at the assigned exposure level for the detected location. In some embodiments, the environment exposure parameter 454 may be expressed as an equivalent number of days spent in a high salinity environment.

Moreover, at 402 of the method 400, the sensor system 109 may detect different flight phases of the vehicle 102 using the FMS sensor 132 or other system, and the timer device 120 may record time spent at take-off throttle settings. Additionally, the timer device 120 may record time spent at climb throttle settings. Furthermore, the sensor system 109 may detect and track the throttle position when the vehicle 102 is at cruise settings. The processor 114 or the processor 140 may process this data and determine multiple throttle parameters 456 (FIG. 5), including an average time spent at take-off throttle settings for the time period, average time spent at climb throttle settings for the time period, and an average throttle position (measured in degrees) at cruise settings for the time period.

The method 400 may continue at 404, wherein the scoring module 148 generates usage scores according to the usage parameters 452, 454, 456 determined at 402. As such, the scoring module 148 evaluates usage history of the tracked vehicle 102 and/or engine 103 in comparison with the rest of the fleet 101a. Specifically, as represented in the data flow process 450 of FIG. 6, the scoring module 148 may utilize the fleet flight time model 221 and generate a flight time score 51 according to the flight time parameter 452 determined at 402. As represented in FIG. 4A, if the flight time usage parameter is detected (at 402) at point 399 on the X-axis, then the flight time score S1 would equal approximately 0.8. The usage score may be saved at the usage database 152 for the particular user.

Similarly, the scoring module 148 may utilize the fleet exposure model 223 and generate an exposure score S2 according to the environment exposure parameter 454 determined at 402. The exposure score S2 may range between zero and one in some embodiments, with higher amounts of exposure receiving scores closer to zero and vice versa.

Furthermore, the scoring module 148 may utilize the fleet exposure models 230, 232, 234 and generate throttle scores 464 according to the throttle power parameters 456 determined at 402. Using the take-off usage model 230, the processor 140 may generate a take-off score S3A according to the average take-off time parameter determined at 402. The take-off score S3A may range between zero and one in some embodiments, with lower average take-off times receiving scores closer to one and vice versa. Moreover, using the climb usage model 232, the processor 140 may generate a climb score S3B according to the average climb time parameter determined at 402. The climb score S3B may range between zero and one in some embodiments, with lower average climb times receiving scores closer to one and vice versa. Additionally, using the cruise usage model 234, the processor 140 may generate a cruise score S3C according to the average cruise throttle position parameter determined at 402. The cruise score S3C may range between zero and one in some embodiments, with lower average cruise throttle positions receiving scores closer to one and vice versa. In some embodiments, these three throttle scores S3A, S3B, S3C may be combined into the single combined throttle power score S3 according to the combined throttle power model 236. For example, the processor 140 may weight the three throttle scores S3A, S3B, S3C to produce the combined throttle power score S3. In other words:

$$S3 = a*S3A + b*S3B + c*S3C$$

where a, b, and c, are the applied weight variables, and where the sum of a, b, and c is equal to one (1). In some embodiments, the processor 140 may weight the three throttle scores S3A, S3B, S3C equally (i.e., a, b, and c are equal to ⅓); however, it may be appreciated that more weight may be applied to one throttle score than another.

The method 400 may continue at 406, wherein the scoring module 148 combines the flight time score S1, the exposure score S2, and the throttle power score S3 and generates a combined usage score 468 for the vehicle 102 and engine(s) 103 tracked at 402. The combined usage score 468 may be saved at the usage database 152 of the server device 111.

Figure 6:
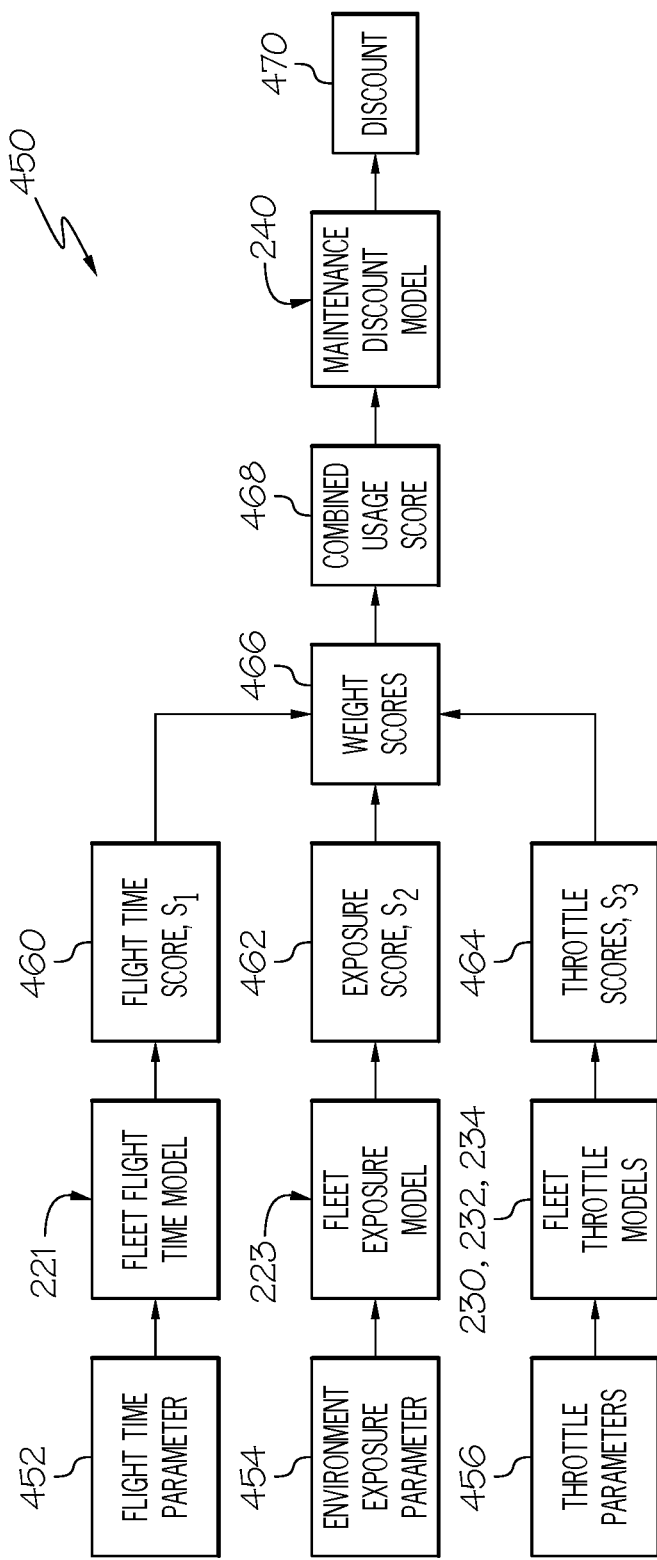
FIG. 6 is a schematic illustration of data processing performed according to the method of FIG. 5.
Figure 7:
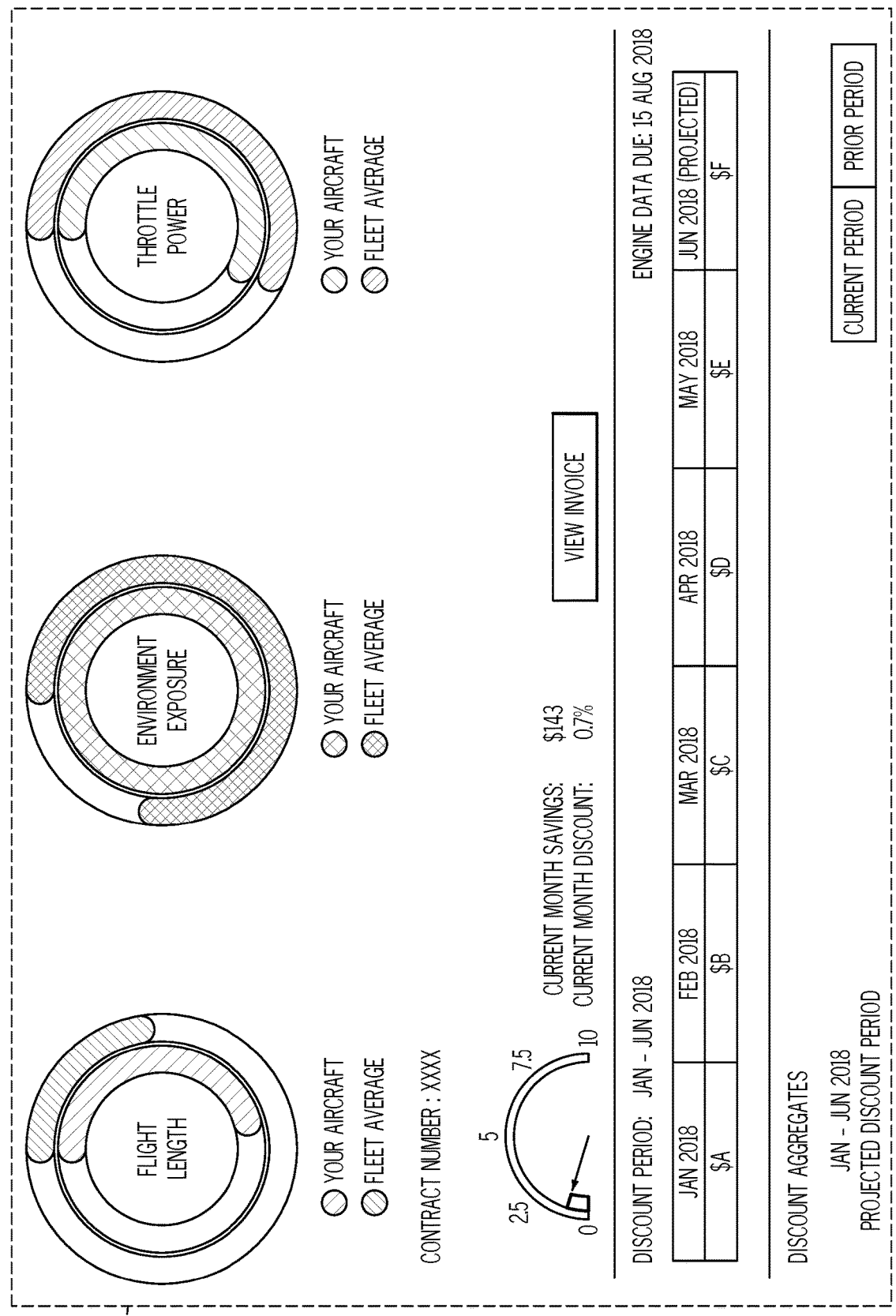
FIG. 7 is a schematic illustration of a user interface of the system according to example embodiments of the present disclosure.

In some embodiments, represented in FIG. 6, the processor 140 may apply different weights 466 to the flight time score S1, the exposure score S2, and the throttle score S3 to produce the combined usage score 468. For example, average flight time may have the strongest correlation to engine wear rate. Therefore, the flight time score S1 may be weighed heavier than the exposure score S2 and the throttle score S3. Also, the amount of environment exposure may have the next highest correlation to engine wear rate. Thus, the exposure score S2 may be weighted heavier than the throttle power score S3. The throttle power parameters may have the loosest correlation to engine wear; therefore, the processor 140 may apply the smallest weight to the throttle score S3. Accordingly, in some embodiments, the combined usage score 468 may range between zero and one. Combined usage scores 468 closer to one may reflect usage that tends to cause less wear on the engine 103. Scores closer to zero may reflect usage that tends to cause more wear on the engine 103.

Next, at 408 of the method 400, the discount module 149 may determine a discount for the user of the vehicle 102 and engine(s) tracked at 402. The discount module 149 may utilize the discount model 240 to determine a discount 470 according to the combined usage score 468. A higher combined usage score 468 may result in a higher discount 470, and a lower combined usage score 468 may result in a smaller discount 470. As represented in FIG. 4B, if the combined score is calculated to be at point 499 on the X-axis, then the discount percentage would equal approximately Y/2. The processor 140 may access the contract database 150 and correlate the discount 470 with the contract for the corresponding user.

Then, at 410 of the method 400, information about the discount 470 may be communicated to the user. For example, the server device 111 may send control commands to the terminal device 105 of the vehicle 102 tracked at 402. The control commands may cause the user interface 104 to output the calculated discount 470. In some embodiments, the discount 470 may be displayed visually by the user interface 104.

In some embodiments represented in FIG. 6, the user interface 104 may display a user's contract number along with a visual representation of their usage scores for the past month. The fleet average may also be displayed for purposes of comparison. The "current month savings" and "current month discount" (calculated at 408) may be displayed as well. Additionally, past usage and/or past discount information from another time period may also be displayed.

Accordingly, the system 100 and methods 200, 400 of the present disclosure provide fairer pricing for maintenance and/or other services. Users that use the engine in a manner which results in lower maintenance costs can earn higher discounts than users that put more strain on their engine. Also, users may be incentivized to use a vehicle 102 and its engine(s) 103 in a manner that causes less wear over time. Additionally, the models used for adjusting and determining user discounts can be formulated for efficiently and effectively rewarding users at different levels based on their usage history. The fleet usage models and/or the discount models may be configured and re-configured according to important factors, achieving fairness, efficient use of resources, and providing predictability. Furthermore, the system 100 and its methods 200, 400 can provide useful information to users about their usage history and how it compares to the rest of the fleet.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the present disclosure as set forth in the appended claims.

What is claimed is:

1. A method of operating a usage-based maintenance system for a plurality of vehicles arranged in a fleet, the method comprising:

receiving, by a processor, detected usage data from the fleet, the usage data including a usage parameter for individual ones of the plurality of vehicles within the fleet over a predetermined time period;

generating, by the processor from the usage data, a fleet usage distribution of the usage parameter for the plurality of vehicles across the fleet;

generating, by the processor, a fleet usage model according to the fleet usage distribution, the fleet usage model expressing a score as a function of the usage parameter;

generating, by the processor a score distribution of the score for the plurality of vehicles across the fleet;

generating, by the processor, a reward model according to the score distribution, the reward model expressing a maintenance reward as a function of the score;

receiving, by the processor, the usage parameter of one of the plurality of vehicles;

determining, by the processor using the fleet usage model, the score for the one of the plurality of vehicles according to the received usage parameter for the one of the plurality of vehicles; and determining, by the processor using the reward model, the maintenance reward for the one of the plurality of vehicles according to the score determined for the one of the plurality of vehicles.

2. The method of claim 1, wherein the fleet usage model includes a first piecewise linear function expressing the score as a function of the usage parameter; and wherein the reward model includes a second piecewise linear function expressing the maintenance reward as a function of the score.

3. The method of claim 2, wherein the first piecewise linear function defines a first threshold usage parameter and a second threshold usage parameter;

wherein, according to the first piecewise linear function, the score ranges between a minimum score and a maximum score for usage parameters that are between the first and second threshold usage parameters.

4. The method of claim 3, wherein the first piecewise linear function defines an intermediate point corresponding to an intermediate usage parameter and an intermediate score, the intermediate usage parameter being between the first and second threshold usage parameters, the intermediate score being between the minimum and maximum scores;

further comprising adjusting the intermediate point to adjust the first piecewise linear function.

5. The method of claim 2, wherein the second piecewise linear function defines a first threshold score and a second threshold score;

wherein, according to the second piecewise linear function, the maintenance reward ranges between a minimum reward and a maximum reward for scores that are between the first and second threshold scores.

6. The method of claim 5, wherein the second piecewise linear function defines an intermediate point corresponding to an intermediate score and an intermediate reward, the intermediate score being between the first and second threshold scores, the intermediate reward being between the minimum and maximum rewards;

further comprising adjusting the intermediate point to adjust the second piecewise linear function.

7. The method of claim 1, wherein the usage parameter includes at least one of:

a flight time usage parameter indicating time spent in-flight during the time period;

an environmental exposure usage parameter indicating an amount of exposure to an environment during the time period; and a throttle power usage parameter indicating powering of an engine of the vehicle during the time period.

8. The method of claim 7, wherein the usage data includes at least two of the flight time usage parameter, the environmental exposure usage parameter, and the throttle power usage parameter;

wherein generating the fleet usage distribution includes generating a first fleet usage distribution of one of the at least two of the flight time usage parameter, the environmental exposure usage parameter, and the throttle power usage parameter;

further comprising generating a second fleet usage distribution of another of the at least two of the flight time usage parameter, the environmental exposure usage parameter, and the throttle power usage parameter;

further comprising generating a first usage model according to the first fleet usage distribution and a second usage model according to the second fleet usage distribution, the first fleet usage model expressing a first score as a function of the one of the at least two of the flight time usage parameter, the environmental exposure usage parameter, and the throttle power usage parameter, the second fleet usage model expressing a second score as a function the other of the at least two of the flight time usage parameter, the environmental exposure usage parameter, and the throttle power usage parameter; and wherein generating the score distribution includes combining the first score and the second score into a combined score for individual ones of the plurality of vehicles and generating the score distribution of the combined score for the fleet.

9. The method of claim 8, wherein combining the first score and the second score includes weighting the first score and the second score differently to produce a combined weighted usage score; and wherein determining the maintenance discount includes determining the maintenance discount according to the combined weighted usage score.

10. The method of claim 1, wherein the maintenance reward is a discount percentage on maintenance pricing.

11. The method of claim 1, further comprising displaying the maintenance reward determined for the one of the plurality of vehicles.

12. A usage-based maintenance system for a plurality of vehicles arranged in a fleet, the system comprising:

a data storage device; and a processor configured to receive detected usage data from the fleet, the usage data including a usage parameter for individual ones of the plurality of vehicles within the fleet over a predetermined time period;

the processor configured to generate a fleet usage distribution of the usage parameter for the plurality of vehicles across the fleet;

the processor configured to generate a fleet usage model according to the fleet usage distribution, the fleet usage model expressing a score as a function of the usage parameter;

the processor configured to generate a score distribution of the score for the plurality of vehicles across the fleet;

the processor configured to generate and save on the data storage device a reward model according to the score distribution, the reward model expressing a maintenance reward as a function of the score;

the processor configured to receive the usage parameter of one of the plurality of vehicles;

the processor configured to determine, using the fleet usage model, the score for the one of the plurality of vehicles according to the received usage parameter for the one of the plurality of vehicles; and the processor configured to determine, using the reward model, the maintenance reward for the one of the plurality of vehicles according to the score determined for the one of the plurality of vehicles.

13. The system of claim 12, wherein the fleet usage model includes a first piecewise linear function expressing the score as a function of the usage parameter; and wherein the reward model includes a second piecewise linear function expressing the maintenance reward as a function of the score.

14. The system of claim 13, wherein the first piecewise linear function defines a first threshold usage parameter and a second threshold usage parameter;

wherein, according to the first piecewise linear function, the score ranges between a minimum score and a maximum score for usage parameters that are between the first and second threshold usage parameters.

15. The system of claim 14, wherein the first piecewise linear function defines an intermediate point corresponding to an intermediate usage parameter and an intermediate score, the intermediate usage parameter being between the first and second threshold usage parameters, the intermediate score being between the minimum and maximum scores;

wherein the intermediate point is adjustable for adjusting the first piecewise linear function.

16. The system of claim 13, wherein the second piecewise linear function defines a first threshold score and a second threshold score;

wherein, according to the second piecewise linear function, the maintenance reward ranges between a minimum reward and a maximum reward for scores that are between the first and second threshold scores.

17. The system of claim 16, wherein the second piecewise linear function defines an intermediate point corresponding to an intermediate score and an intermediate reward, the intermediate score being between the first and second threshold scores, the intermediate reward being between the minimum and maximum rewards;

further comprising adjusting the intermediate point to adjust the second piecewise linear function.

18. The system of claim 12, further comprising a sensor system configured to detect the usage parameter from at least one of:

a flight time usage parameter indicating time spent in-flight during the time period;

an environmental exposure usage parameter indicating an amount of exposure to an environment during the time period; and a throttle power usage parameter indicating powering of an engine of the vehicle during the time period.

19. The system of claim 18, wherein the sensor system is configured to detect at least two of the flight time usage parameter, the environmental exposure usage parameter, and the throttle power usage parameter;

wherein the processor is configured to generate the fleet usage distribution to include a first fleet usage distribution of one of the at least two of the flight time usage parameter, the environmental exposure usage parameter, and the throttle power usage parameter;

wherein the processor is configured to generate a second fleet usage distribution of another of the at least two of the flight time usage parameter, the environmental exposure usage parameter, and the throttle power usage parameter;

wherein the processor is configured to generate a first usage model according to the first fleet usage distribution and a second usage model according to the second fleet usage distribution, the first fleet usage model expressing a first score as a function of the one of the at least two of the flight time usage parameter, the environmental exposure usage parameter, and the throttle power usage parameter, the second fleet usage model expressing a second score as a function the other of the at least two of the flight time usage parameter, the environmental exposure usage parameter, and the throttle power usage parameter; and wherein the processor is configured to generate the score distribution by combining the first score and the second score into a combined score for individual ones of the plurality of vehicles and generate the score distribution of the combined scores for the fleet.

20. A method of operating a usage-based maintenance system for a plurality of aircraft arranged in a fleet, the method comprising:

receiving, by a processor, detected usage data that includes at least two usage parameters for individual ones of the plurality of vehicles within the fleet over a predetermined time period, the at least two usage parameters chosen from a group consisting of a flight length parameter, an environmental exposure parameter, and a throttle setting parameter;

generating, by the processor from the detected usage data, a first fleet usage distribution of one of the at least two usage parameters;

generating, by the processor from the detected usage data, a second fleet usage distribution of another of the at least two usage parameters;

generating, by the processor, a first fleet usage model according to the first fleet usage distribution, the first fleet usage model expressing a first score as a function of the one of the at least two usage parameters;

generating, by the processor, a second fleet usage model according to the second fleet usage distribution, the second fleet usage model expressing a second score as a function of the other of the at least two usage parameters;

combining, by the processor, the first score and the second score into a combined score for individual ones of the plurality of aircraft;

generating a combined score distribution of the combined score for the plurality of aircraft across the fleet;

generating, by the processor, a reward model according to the combined score distribution, the reward model expressing a maintenance service discount percentage as a function of the combined score;

receiving, by the processor, the at least two usage parameters of one of the plurality of vehicles;

determining, by the processor using the first and second fleet usage models, the first score and the second score for the one of the plurality of vehicles according to the at least two usage parameters received for the one of the plurality of vehicles;

determining, by the processor, the combined score for the one of the plurality of vehicles according to the determined first and second scores for the one of the plurality of vehicles; and determining, by the processor using the reward model, the maintenance service discount percentage for the one of the plurality of vehicles according to the combined score determined for the one of the plurality of vehicles.

* * * * *